(No Model.)

A. GIPPERICH.
PROCESS OF DETERMINING THE CENTER OF ATTRACTION IN POLARIZED BODIES.

No. 401,428. Patented Apr. 16, 1889.

Witnesses:
J. Thomson Cross
Mill. C. Rouzee

Inventor:
Adolphus Gipperich,
per Henry M.
Attorney.

UNITED STATES PATENT OFFICE.

ADOLPHUS GIPPERICH, OF RICHMOND, VIRGINIA.

PROCESS OF DETERMINING THE CENTER OF ATTRACTION IN POLARIZED BODIES.

SPECIFICATION forming part of Letters Patent No. 401,428, dated April 16, 1889.

Application filed January 19, 1889. Serial No. 296,821. (No model.)

*To all whom it may concern:*

Be it known that I, ADOLPHUS GIPPERICH, a citizen of the United States, residing at Richmond, in the county of Henrico and State of Virginia, have invented certain new and useful Improvements in the Process or Mode of Determining the Center of Attraction in Polarized Bodies; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for its object the provision of means for determining the center of attraction of polarized bodies or the point of leverage of equilibrated polarized bodies; and it consists in the process or method of determining the center of attraction in a polarized body or the point of leverage in a polarized equilibrated body, substantially as hereinafter fully described, and as set forth in the claims.

In the accompanying drawings, Figures 1, 2, 3, and 4 are views of a scale-beam, illustrating the process of determining the point of leverage of a balanced polarized body or scale-beam.

In instruments as heretofore constructed for determining by weight the value of electric, magnetic, or electro-magnetic forces the fact that such forces do not influence a magnetized or polarized scale-beam uniformly, and the further fact that terrestrial magnetism is a potent factor in weighing such forces, had to be ignored simply for want of means to take these into proper consideration and determine their value.

All such instruments as heretofore constructed or proposed must necessarily give erroneous results.

That my invention may be fully understood, I will describe the same in detail, reference being had to the accompanying drawings.

Figure 1:
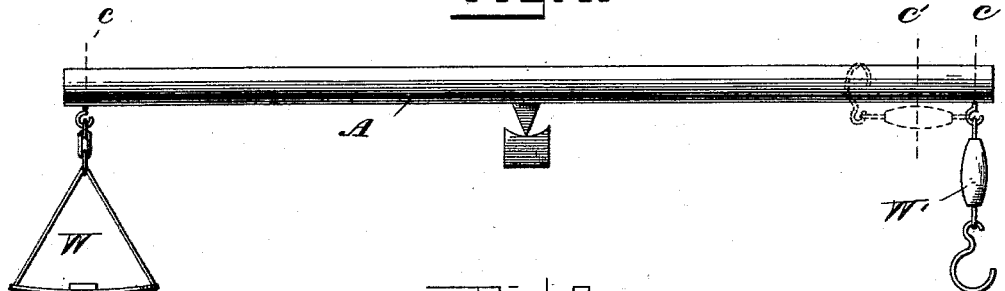
Figure 2:
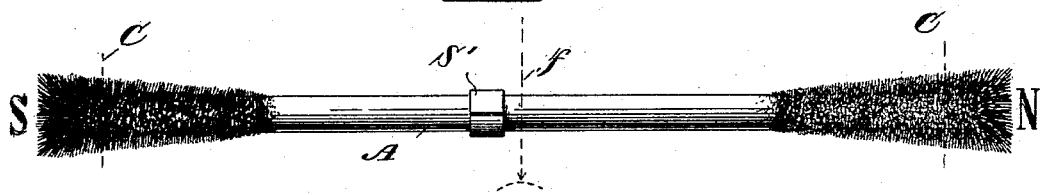
Figure 3:
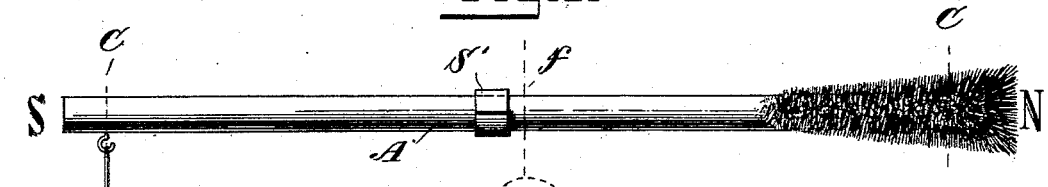
Figure 4:
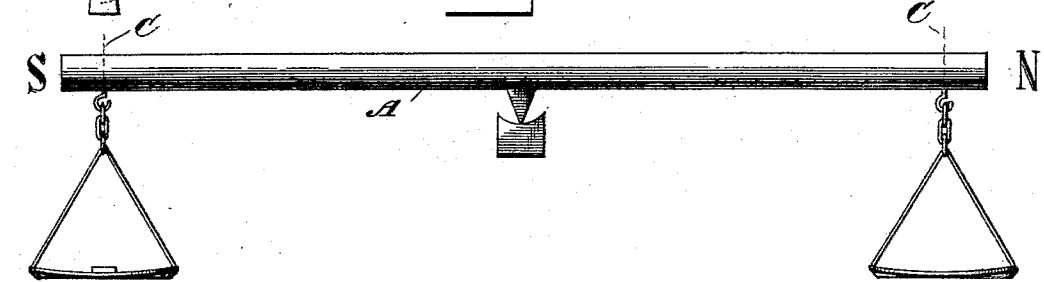

The first step in the construction of an instrument in which a polarized scale-beam is employed for determining the value of electric or magnetic or electro-magnetic forces is to choose a scale-beam of substantially uniform sectional area throughout. For this purpose I employ a round bar of steel, A, which I will hereinafter call the "scale-beam." The next step is to counterpoise the scale-beam accurately on knife-edges, and then magnetize or polarize the beam in any usual well-known or preferred manner. The third step is to ascertain the center of attraction or the point of leverage of the scale-beam. This is one of the most important steps in the process of weighing forces of the nature referred to, for the reason that the force of attraction in a magnetized or polarized bar is not uniformly distributed throughout the length thereof. Let, for instance, A, Fig. 1, be a perfectly equilibrated non-polarized scale-beam, the weights W and W' being of the same value; now, let W' be placed in the position shown in dotted lines, thereby shifting the center of gravity thereof from $c$ to $c'$, nearer to the fulcrum. It is obvious that W would not now counterbalance W'. Let a magnetized or polarized body be embedded in iron filings and withdrawn, and it will be found that these filings will arrange themselves somewhat as shown in Figs. 2 and 3, showing conclusively that the center of attraction is at a point intermediate the extremes and the fulcrum $f$ of the two limbs of the scale-beam. It is obvious, therefore, that counterpoises suspended at any point outside of the center of attraction, although it may be a perfect counterpoise, will not express the value of the force counterpoised thereby, since a magnetic, electric, or electro-magnetic force will exert its power on a magnetized bar according to the magnetism stored and distributed therein, as shown by the distribution of the filings thereon, and consequently exerts its force on a lever that may be shorter or longer than that at which such counterpoise is suspended. Thus, for instance, let a polarized scale-beam, A, be placed on a line at right angles to the magnetic meridian, the current of terrestrial magnetism being in a vertical direction, the beam will at once tend to place itself parallel with the current with its north pole down and south pole up. It is proposed to determine the value of this force by weight. If a weight is suspended from the point $c$ at the south pole, so as to counterbalance the force exerted on the beam, will this weight indicate the true value of these forces. Evidently not, since the center of attraction is not at c on the north-pole end of the beam, but at a point much nearer the fulcrum—as at C, for instance—and we have here the same result as described with reference to the non-polarized beam, Fig. 1, and weights W W', when the latter are placed in the position shown in dotted lines. The importance of ascertaining the center of attraction is therefore self-evident, as it constitutes in the polarized scale-beam the point of leverage or lengths of lever-arms from which the gravital force must be suspended in order to indicate by its weight the true value of a magnetic or electro-magnetic force exerted upon the beam. The mode of ascertaining the center of attraction will now be described.

The polarized scale-beam is first neutralized or counterbalanced against the influence of terrestrial magnetism by first placing it on a line east and west, so as to swing in a plane at right angles to the magnetic meridian. Under the magnetic force exerted on the beam the latter will have a tendency to place itself parallel with the current with its north pole down and south pole up. This tendency of the scale beam I neutralize by counterbalancing the force of terrestrial magnetism. This I effect by means of a split sleeve, S', which is slipped upon the south limb of the scale-beam. Said sleeve should be of such a weight as to counterpoise the force of terrestrial magnetism when shifted to a point near the fulcrum of the beam to leave the ends of the limbs free. The sleeve is split to clamp the beam tightly, so that when adjusted to hold said beam in a perfectly horizontal or equilibrated position it cannot be displaced. The beam is then embedded in iron filings—that is to say, I load the beam with all the iron filings its force of attraction is capable of holding and then remove and carefully weigh the load. This operation is repeated and the average of the several loads calculated. This will give the average force of attraction of the beam. Now, supposing that five loads will give an aggregate of one hundred milligrams, or an average of twenty milligrams, this will give an average attractive force of ten milligrams for each pole. I again load the beam and remove the load from the south limb only and set the beam on its knife-edge supports on a line due east and west, so as to swing in a plane at right angles to the magnetic meridian, and suspend from said south limb a weight equal to ten milligrams at a point where it will counterbalance the load on the north limb, which point of suspension for the weight will give the center of attraction, C, or point of leverage of both limbs of the beam. Having thus ascertained the center of attraction of both limbs of the beam, the filings on the north limb are removed, the point of suspension of the weight on the south limb measured and laid out on the north limb, so that both points will be equidistant from the fulcrum of the beam. From these points so obtained the scale-pans will be suspended after removal of the counter-balance S' for the force of terrestrial magnetism. The said scale-pans must of course be of like weight and counterbalance each other exactly, as ascertained by suspension from the scale-beam at points equidistant from its fulcrum prior to polarizing such scale-beam. Sufficient weight is now placed in the pan on the south limb to again counterbalance the force of terrestrial magnetism, so that a scale-beam is obtained in which not only matter is accurately counterpoised, but in which both the gravital and electric or other like force exert their power at one and the same point or upon levers of equal length, and which is neutralized as against the influence of terrestrial magnetism when placed on a line east and west or at right angles to the magnetic meridian. The added weight of course is now a known quantity, and will accurately indicate the value of the force of terrestrial magnetism, and is therefore a standard of comparison in weighing all other magnetic, electric, or electro-magnetic forces. The scales are now ready for weighing such forces, which are made to influence the scale-beam in a manner similar to that of terrestrial magnetism or in a vertical direction, with their south pole up and north pole down and perpendicular to the center of attraction either of the north or south pole of the scale-beam—that is to say, the forces to be weighed may be made to influence either the south or the north pole of the scale-beam. The forces exerted upon the scale-beam are then simply an augmentation of the force of terrestrial magnetism, and the plus weight necessary to counterbalance the beam against the influence of such forces will necessarily indicate their value.

In practical use the scale-beam of the instrument must lie in a plane east and west, as intimated above, or in a plane at right angles to the magnetic meridian, because in that position alone the beam is neutralized as to the influence of terrestrial magnetism, performing, in fact, the functions of ordinary scales. Placed in any other plane the scale would not be as sensitive, as the horizontal force of terrestrial magnetism acting on the beam would tend to hold it horizontal and act in a manner similar to the gravital force exerted by the tongue. If the instrument is to be adapted for weighing in other planes, a non-polarized scale-beam must be combined with the polarized body, the former acting on a horizontal line, while the polarized body is set with its poles at right angles to the direction of the magnetic force, whatever the angle of force might be. The mode of neutralizing a polarized body when such body swings in the plane of the magnetic meridian or in other planes has been fully described in an application for patent for an apparatus for determining the value of electric, magnetic, or electromagnetic forces, filed about January 24, 1888, Serial No. 261,731, and need not be described further herein, as one example will suffice to show how such a body may be neutralized as against terrestrial magnetic influence in order to obtain absolutely correct results. I would here also remark that in instruments for weighing forces of some magnitude the scale-beam will be the most convenient, the instrument described in the application above referred to being more especially designed for weighing forces of comparatively-limited power.

I do not desire to claim herein the mode of determining the value of electric, magnetic, or electro-magnetic forces by weight, as this forms the subject-matter of an application for patent of the United States, filed September 25, 1888, Serial No. 286,372.

Having described my invention, what I claim, and desire to secure by Letters Patent, is—

1. The mode or process of determining the center of attraction or point of leverage in a polarized body, which consists in neutralizing such body against the influence of terrestrial magnetism, loading the poles of the body with a substance capable of being attracted and held thereby, removing the load from one of the poles, weighing such load, and suspending an equal weight from said pole at a point where it will equilibrate the load at the opposite pole, as described, for the purposes specified.

2. In the art of determining the center of attraction or point of leverage in a polarized bar or beam, the herein-described process of neutralizing such body as against the influence of terrestrial magnetism, which consists in magnetizing or polarizing an equilibrated bar or beam and maintaining such bar or beam in a state of equilibrium as against the force of terrestrial magnetism by a weight suspended from one of the links thereof, substantially as and for the purposes specified.

In testimony whereof I affix my signature in presence of two witnesses.

ADOLPHUS GIPPERICH.

Witnesses:
S. McG. FISHER,
CHARLES EUKER.